United States Patent [19]

Barnhart

[11] 3,709,647
[45] Jan. 9, 1973

[54] APPARATUS FOR FORMING AN EMBOSSED THERMOPLASTIC SHEET

[75] Inventor: Charles Calvin Barnhart, Hoffman Estates, Ill.

[73] Assignee: Clear Pack Company, Schiller Park, Ill.

[22] Filed: Oct. 21, 1970

[21] Appl. No.: 82,756

[52] U.S. Cl. ............... 425/224, 264/92, 425/365, 425/363
[51] Int. Cl. .............................................. B29d 7/10
[58] Field of Search ....18/1 FE, 10, 15 R, 15 S, 19 F, 18/19 P, 19 R, 21, 4 R; 425/224

[56] References Cited

UNITED STATES PATENTS

| 3,027,596 | 4/1962 | Knowles | 18/19 F |
| 3,085,292 | 4/1963 | Kindseth | 18/10 X |
| 3,089,191 | 5/1963 | Conrad | 18/21 |
| 3,416,466 | 12/1968 | Weidenmiller | 18/21 X |
| 3,515,778 | 6/1970 | Fields et al. | 18/21 X |

FOREIGN PATENTS OR APPLICATIONS 1,435,668   3/1966   France ................ 18/19 F

*Primary Examiner*—J. Howard Flint, Jr.
*Attorney*—Hume, Clement, Hume & Lee

[57] ABSTRACT

An apparatus for vacuum forming an embossed design on a sheet of thermoplastic material. Softened thermoplastic material is formed into a sheet and extruded directly onto a vacuum-forming embossing roller, and subsequently removed from the roller. The core of the forming roller is hollow, with an annular space formed therein. A rod member is spirally wrapped around this annular space to form a spiral channel for passing a cooling medium through the forming roller.

3 Claims, 5 Drawing Figures

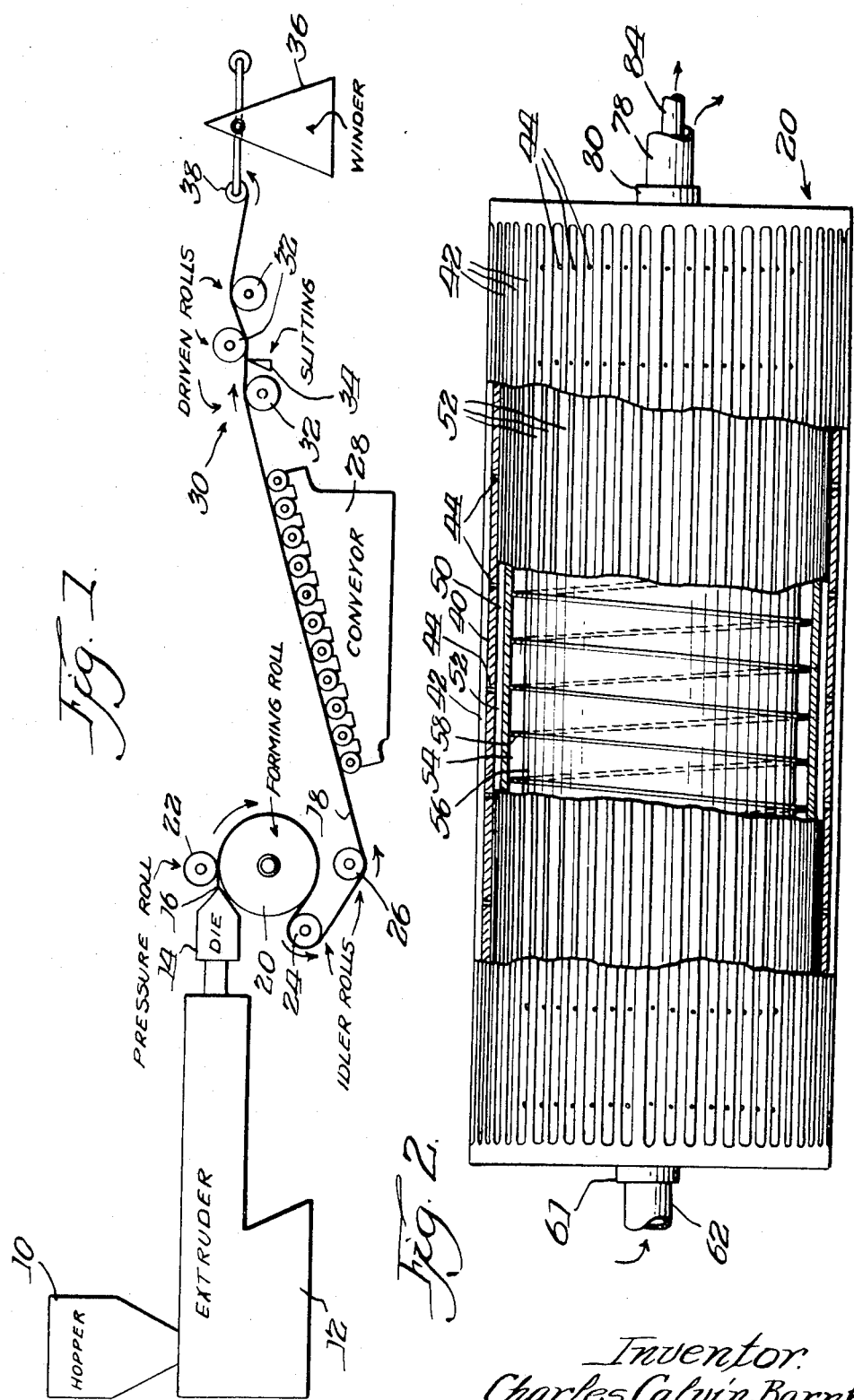

PATENTED JAN 9 1973

Inventor.
Charles Calvin Barnhart.
By Roy E. Hofer, & Howard B. Rockman
Attys.

APPARATUS FOR FORMING AN EMBOSSED THERMOPLASTIC SHEET

BACKGROUND OF THE INVENTION

1. Field of the Invention

This invention relates to a novel apparatus for forming embossed sheets of thermoplastic film material, and more particularly, to an apparatus for extruding a sheet of thermoplastic film directly onto a vacuum-forming embossing roller. The roller includes a novel means for creating a more efficient circulation of a cooling medium through the roller, thereby permitting high speed operation of the process.

2. Description of the Prior Art

Methods of forming embossed sheets of thermoplastic material are known in the prior art which involve the formation of a sheet of thermoplastic material, and passing this sheet directly onto a drum which is machined to form a pattern on the sheet. The sheet is then embossed by pressing the thermoplastic material between two rollers, one of which contains indentations in the surface thereof corresponding to the pattern to be embossed on the sheet of thermoplastic material. The prior art also teaches the forming of a hot finished form thermoplastic sheet on a rotating drum by means of suction. Further forming or embossing rollers are taught in the prior art which have multiple coaxial layers, use suction to form an embossed pattern on a sheet of thermoplastic material, and comprise internal cooling means.

SUMMARY OF THE INVENTION

The present invention relates to an apparatus for extruding a sheet of thermoplastic material directly onto a rotating vacuum-forming roll or drum to inexpensively produce an attractive, well-defined, embossed pattern in the thermoplastic film. Softened thermoplastic material is formed into a homogeneous sheet which is passed directly onto a forming roll. The roll impresses an embossed pattern in the softened thermoplastic material by means of suction. Novel means are provided in the forming roll to circulate a cooling medium through the interior of the roll in a spiral pattern, which increases the efficiency of distribution of the cooling medium throughout the roller, thereby permitting the apparatus of the present invention to operate at higher speeds than would ordinarily be possible.

BRIEF DESCRIPTION OF THE DRAWINGS

FIG. 1 is a schematic side elevational view of an embossing apparatus;

FIG. 2 is a partially cut-away side elevation view of the forming roll shown schematically in FIG. 1;

DESCRIPTION OF THE PREFERRED EMBODIMENT

Figure 3:
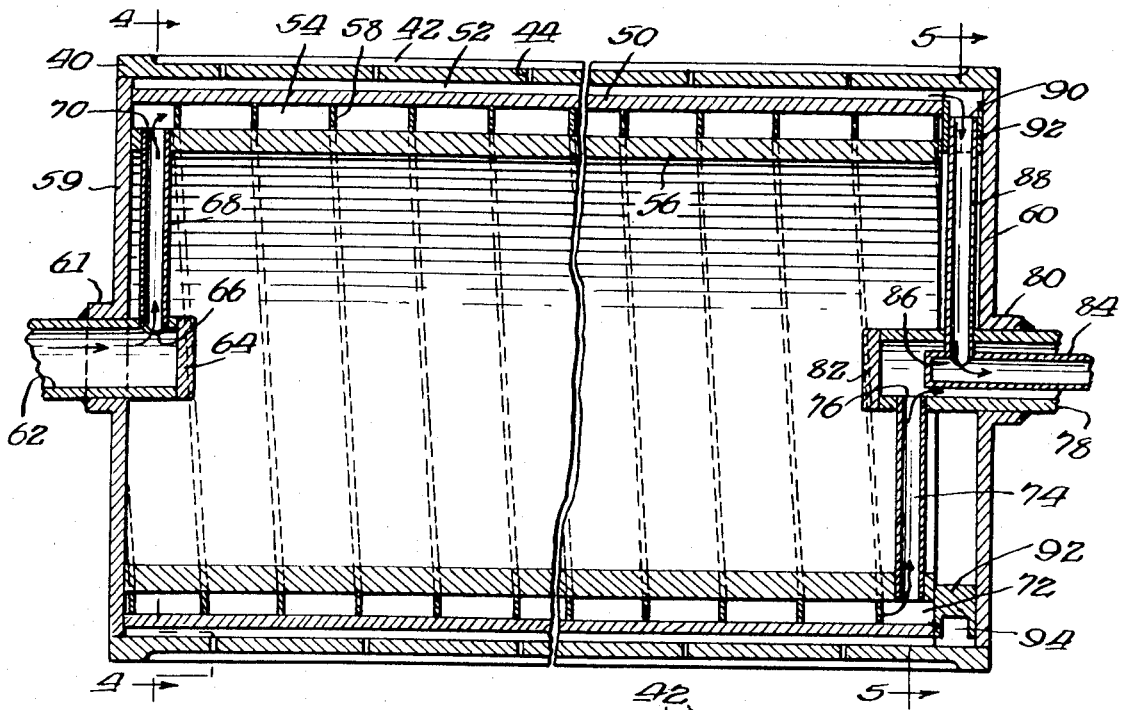
FIG. 3 is a cross-sectional view of the forming roll of FIG. 2.

Referring to the drawings, and more particularly to FIG. 1, a hopper 10 supplies thermoplastic material to a conventional extruder 12. The thermoplastic material can be any thermoformable plastic material, as contrasted with a thermosetting substance. For example, the present invention can produce an embossed surface on films composed of polystyrene, rubber modified polystyrene, polypropylene, polyethylene, polyvinyl chloride, or various copolymers of styrene, and any other thermoplastic materials which are formable and extrudable. The thermoplastic material is melted and forced into a flat sheet extrusion die 14 at a controlled rate by extruder 12. The die 14 discharges the thermoplastic material through an opening 16 in the form of a film or sheet 18 which is maintained at a carefully predetermined and controlled cross-sectional dimension of from 2 mil. to 80 mil.

As the sheet of thermoplastic material 18 emerges from discharge opening 16, it is carried directly and tangentially into engagement with the cylindrical surface of forming roll 20 which, as viewed in FIG. 1, rotates about its longitudinal axis in a clockwise direction. As will be explained in more detail, forming roll 20 comprises a machined surface with depressions therein corresponding to the desired pattern to be embossed on the sheet 18 of thermoplastic material. Means are provided for circulating a cooling medium through the interior of forming roll 20 in order that the thermoplastic material 18 passing over the surface of forming roll 20 be quenched adequately while in contact with the roll. Forming roll 20 also is designed such that a vacuum can be applied within the depressions which form the product design in the roll's surface. The vacuum draws the thermoplastic material into the depressions on the surface of forming roll 20, as will be explained.

By locating forming roll 20 in adjacent proximity to discharge opening 16 of die 14, the thermoplastic material remains heated to its softening temperature as it comes into contact with the circumference of the forming roll. A pressure roller 22, having a resilient surface located at or near the point of initial contact between the sheet 18 and the roll 20, presses the softened plastic material into the product design depressions on the surface of roll 20. The suction force holds the film 18 against the roll 20 as it passes around the roller in a substantial arc of over 180° by drawing the hot, soft film tightly against and down into the depressions in the forming roll. This suction may be adequate to eliminate the need for the aforementioned pressure roll 22 when dealing with thinner gauges of film 18. Since the thermoplastic material is softened, the suction force meets little resistance in drawing the material into the depressions.

It will be readily apparent that by locating forming roll 20 adjacent discharge opening 16, and by applying a suction force to the thermoplastic sheet 18 while in contact with forming roll 20, it is not necessary to form a finished sheet of thermoplastic material in a separate step and to reheat it in another step before applying an embossed design to the thermoplastic sheet. The process of the present invention applies an embossed design to a sheet of thermoplastic material immediately after it is formed into a sheet and before it has had an opportunity to cool into a finished product. The application of a suction force to the sheet material while it is still soft insures that the thermoplastic material adheres uniformly to the desired design of the surface of roll 20.

The softened thermoplastic sheet 18 is cooled as the suction force is applied to set the design in the surface of the sheet material 18 prior to it being stripped or removed from the forming roll 20. The cooling medium functions to maintain the temperature of the forming roll below the softening temperature of the thermoplastic film. The film 18 is embossed almost as soon as it initially comes into contact with the surface of forming roll 20. Throughout the remainder of the arc through which the film 18 travels while in contact with roll 20, the film is cooled to set the film so that it will retain its embossed design. The cooling medium passing through forming roll 20 also prevents the forming roll from becoming heated by being in contact with the hot thermoplastic film.

As the sheet 18 of thermoplastic material passes from forming roll 20, idler rollers 24, 26 are provided in adequate numbers to carry the sheet into engagement with a conveyor roll section 28. The sheet 18 then passes to pull or driven roll section 30 where it is engaged and pulled forward by driven rollers 32. Driven roll section 30 moves sheet material 18 forward at a predetermined and properly coordinated rate of speed such that sheet 18 is in contact with the surface of forming roll 20 for a time sufficient to obtain a deep, well-defined, embossed pattern on the film. The actual time during which the film surface is in contact with forming roll 20 is determined by the thickness of the sheet 18. Contact must be maintained long enough to allow cooling of the sheet 18 such that the film retains the shape of the embossed design. A slitting device 34 cuts the thermoplastic film 18 into properly sized strips as it passes between driven rollers 32 on its way to winding mechanism 36, where the strips of embossed thermoplastic material are wound on suitable rolls 38. The addition of a sheeting device in place of the winder can also allow production of sheets of embossed material.

The configuration and design of forming roll 20 is very important to the proper operation of the above process. A method of producing an embossed design on a sheet or film of thermoplastic material has been described which utilizes a single stage, in-line, vacuum-forming operation. The intermediate step of producing a flat thermoplastic film prior to embossing the film by suction has been eliminated. In order to properly carry out this process, the forming roll 20 must be designed so that an adequate suction force may be applied to the softened thermoplastic film while it is in contact with the roll. Of equal importance, roll 20 must be able to convey a cooling medium therethrough in a definite flow pattern which results in a uniform cooling effect across the entire peripheral surface of forming roll 20. Also, the design of the roll must maximize the heat-removal effectiveness of the roll.

These results have been obtained by using a forming roll 20 constructed in accordance with the present invention as illustrated in FIGS. 2–5, and as more fully described hereinbelow. Forming roll 20 is preferably constructed from three concentric sections of heat-conductive material, such as heavy metal wall tubing. A cylindrical sleeve member 40 forms the outer element of roll 20. The outer surface of sleeve member 40 comprises depressions or indentations 42 corresponding to the finished embossed design which is ultimately transferred to thermoplastic sheet 18. The illustrated embodiment shows a linear pattern although it will be understood that other patterns may also be employed. Small vacuum holes or apertures 44, similar to those found on standard vacuum-forming equipment, extend from the outer surface to the inner surface of sleeve member 40 at suitable intervals beneath indentations 42.

Figure 5:
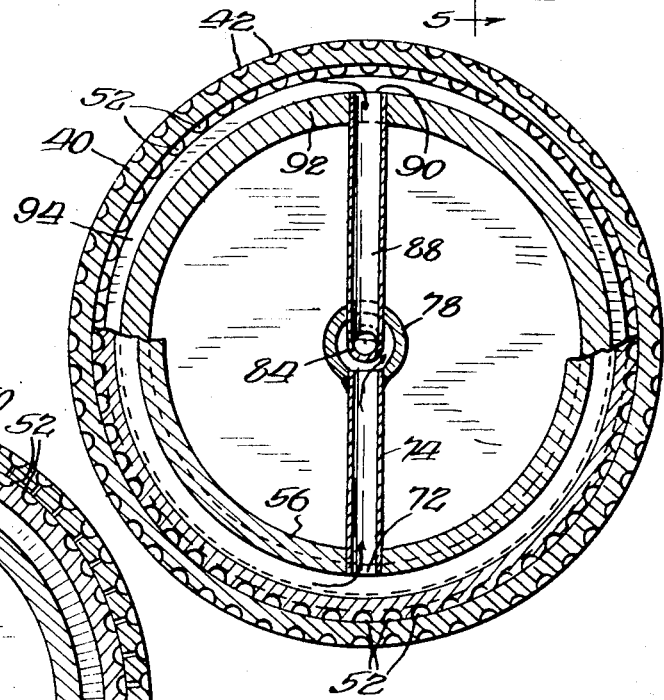
FIG. 5 is a cross-sectional view of the forming roll taken along plane 5—5 in FIG. 3.
Figure 4:
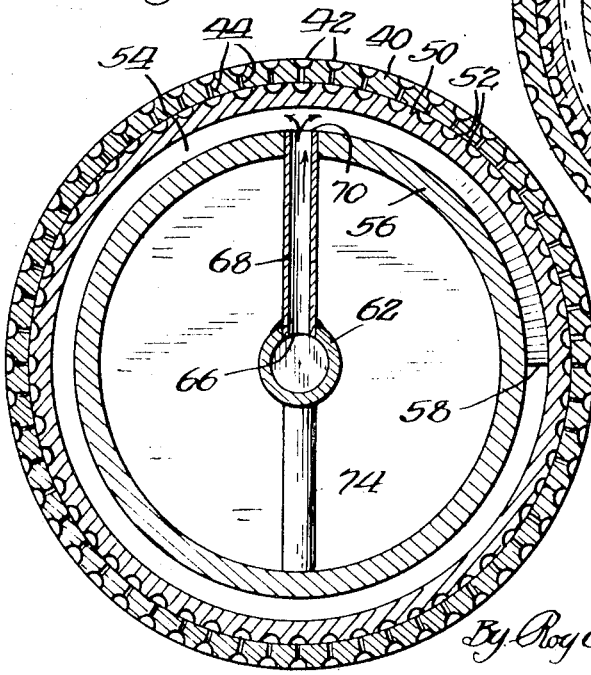
FIG. 4 is a cross-sectional view of the forming roll taken along plane 4—4 in FIG. 3.

Located within sleeve member 40 is a second cylindrical sleeve member 50. Sleeve member 50 snugly fits in abutting relation to the inner surface of sleeve member 40. The outer surface of second sleeve member 50 is provided with longitudinally extending channels 52 aligned with the vacuum holes 44 in a manner which corresponds to the embossing pattern machined in the surface of outer sleeve member 40. This is best seen in FIGS. 4 and 5, wherein each channel 52 is directly beneath a depression 42. The channels 52 extend from one end of second sleeve member 50 to the other, and vacuum holes or pores 44 provide passages between depressions 42 and channels 52 for reasons to be explained.

Located within second sleeve member 50 is a third cylindrical member 56 in spaced relation to sleeve member 50 defining an annular space 54 between second sleeve member 50 and third cylindrical member 56. As illustrated in FIGS. 2–5, cylindrical member 56 is preferably hollow, but may be a solid member. The outer surface of third cylindrical member 56 is wrapped in a spiral manner with a rod-like member 58 in order to form a spiral passage in chamber 54, as best seen in FIGS. 2 and 3. Spiral member 58 fits snugly between second cylindrical sleeve member 50 and third cylindrical member 56.

The three cylindrical members 40, 50 and 56 are supported at their ends by end plates 59, 60. These end plates are dimensionally equal to the inner diameter of outer sleeve member 40, whereby the ends of outer sleeve member 40 may be flush with end plates 59 and 60. Centrally located in end plate 59 is a boss member 61 with an opening therein through which extends a hollow pipe member 62. The end of pipe member 62 is capped as by means of cap 64 internally of forming roll 20. Port means 66 leads to a radially extending conduit 68 which terminates in port means 70 provided in third cylindrical member 56. Through port means 70, conduit 68 communicates with annular space 54, wherein spiral member 58 is located.

Port means 72 is provided in annular space 54 and communicates with radially extending conduit 74. Conduit 74 communicates with port means 76 located in pipe means 78, which extends outwardly from forming roll 20 through boss member 80 in end plate 60. A cap member 82 is provided to terminate the axial extent of pipe means 78.

The passage defined by pipe member 62, conduit 68, annular space 54, conduit 74 and pipe member 78 defines a path through which a cooling medium, such as water or other suitable liquid, is advanced through the forming roll 20. Water, for example, entering pipe member 62 passes through conduit 68 to annular space 54 where rod-like member 58 forces the water to follow a spiral pattern through the forming roll until it reaches port means 72. In this manner, the cooling medium is carried to every part of the inner peripheral surface of forming roll 20, thereby resulting in a uniform cooling of the entire outer circumference of the forming roll. Thence, conduit 74 carries the cooling medium to pipe 78 and to a conventional heat removing and recirculating device, not shown.

Thus, the spirally wound rod-like member 58 provides a definite flow pattern for the cooling medium through annular space 54 and assures a uniform cooling affect across the surface of the forming roll 20. The spiral configuration of the cooling medium path also provides for a high velocity flow of water which produces increased turbulence and greater heat transfer effectiveness. This makes it possible to quench the softened thermoplastic material on a single forming roll of reasonable diameter, and to operate the process of the present invention at substantially higher speeds than heretofore.

Located concentrically within pipe member 78 is suction conduit 84 provided with port means 86 communicating with radially extending conduit 88 internally of forming roll 20. The end of conduit 88 terminates at port means 90 located in suction chamber ring means 92. Ring means 92, as best seen in FIG. 3, comprises a U-shaped channel 94 extending circumferentially about one end of second cylindrical sleeve member 50, whereby chamber 94 directly communicates with the channels 52 located in the second cylindrical sleeve member. In the operative embodiment of forming roll 20, conventional suction means comprising, for example, a standard vacuum pump in the range of 25 inches of mercury, are attached to suction pipe member 84 to withdraw air from channels 52 through U-shaped chamber 94 and conduit 88. As a sheet 18 of thermoplastic material passes over the surface of forming roll 20, air is also withdrawn from beneath the material through ports 44, which communicate between depression 42 and channels 52. In this manner, suction is applied to the softened thermoplastic material, which is drawn into and against the depressions 42 to form the embossed pattern. The spirally moving cooling medium, passing inside of forming roll 20 in annular space 54, removes heat from the softened thermoplastic material, lowers its temperature and aids in the solidification of the embossed sheet 18 before it is removed from contact with roll 20 and passes onto idler roll 24 (FIG. 1).

The removal of heat from the softened thermoplastic material is further enhanced by the relative position of outer cylindrical sleeve member 40 and second cylindrical sleeve member 50. As best illustrated in FIGS. 4 and 5, these two sleeve members abut one another, providing the maximum amount of intimate metal-to-metal contact. This construction increases the conductive heat removal effectiveness of the forming roll 20 and the cooling medium passing spirally through chamber 54.

The foregoing embodiment is exemplary of the apparatus of the disclosed invention, and may be used as a model for constructing the invention. However, many variations of the invention may be made without departing from the spirit and scope of the invention as defined in the following claims.

I claim:

1. An apparatus for producing an embossed thermoplastic film from molten thermoplastic material comprising:

a forming roll comprising a cylindrical outer sleeve member having depressions on the outer surface thereof corresponding to a desired embossed pattern, and having apertures communicating with said depressions; a second cylindrical sleeve member disposed within said outer sleeve member and abutting the inner surface of said outer sleeve member; said second cylindrical member having channel means on the outer surface thereof forming vacuum passages between said outer sleeve member and said second sleeve member, said vacuum passages communicating with said apertures;

means for rotating said forming roll;

means for producing a vacuum in said vacuum passages;

extrusion means located adjacent to said forming roll and being adapted to extrude a sheet of thermoplastic material directly onto said forming roll; and means for continuously removing said embossed sheet from said forming roll.

2. The apparatus as defined in claim 1 wherein said forming roll further comprises a third cylindrical member disposed within said second sleeve member; means defining a spiral-shaped channel between said second and third cylindrical members; and means for delivering a cooling medium to said spiral-shaped channel.

3. The apparatus as defined in claim 2 wherein said means defining a spiral-shaped channel comprises a rod-like member wrapped in spiral fashion around said third cylindrical member.

* * * * *